Aug. 4, 1931.  A. G. SLATCHER  1,817,591
TOOL RETAINER
Filed July 1, 1929
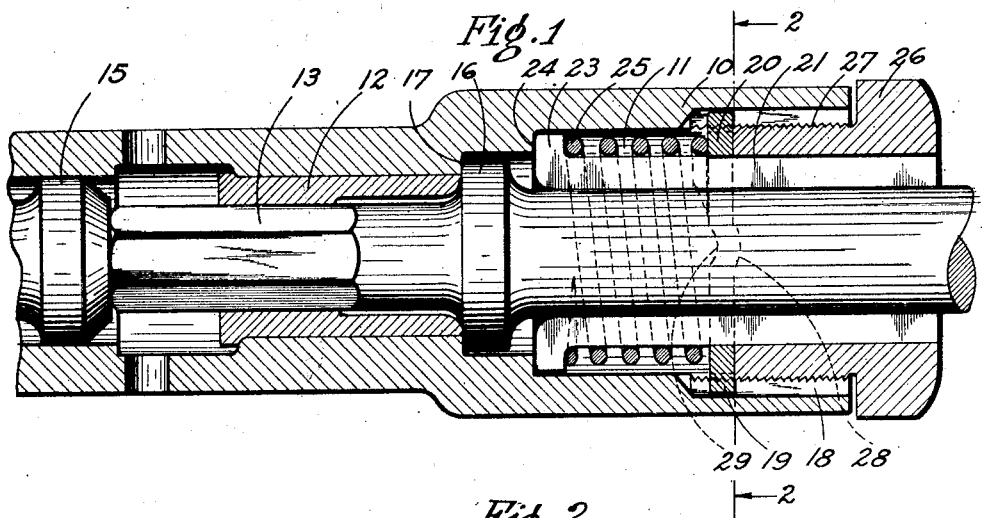
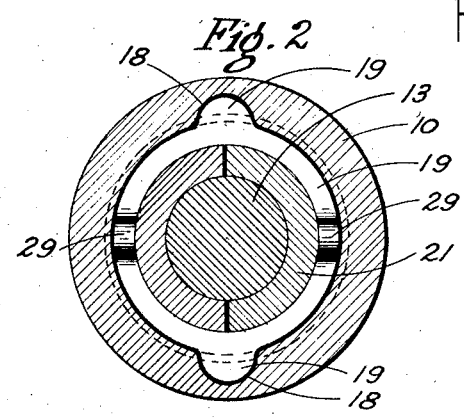
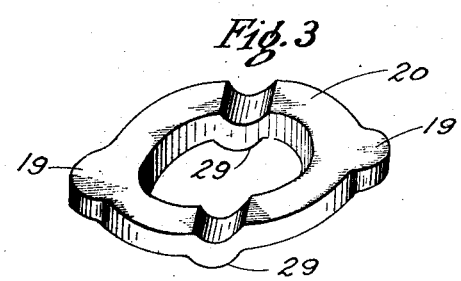
Inventor
ALFRED G. SLATCHER
By Richey & Watts
Attorney Patented Aug. 4, 1931

1,817,591

UNITED STATES PATENT OFFICE

ALFRED G. SLATCHER, OF CLEVELAND, OHIO, ASSIGNOR TO THE CLEVELAND ROCK DRILL COMPANY, OF CLEVELAND, OHIO, A CORPORATION OF OHIO

TOOL RETAINER

Application filed July 1, 1929. Serial No. 375,168.

This invention relates broadly to pneumatic tools more particularly to an improved drill retainer for fluid pressure drills.

One of the objects of the invention is to provide a drill retainer for pneumatic drills wherein the drill will be positively maintained in the proper operative relation in the drill.

Another object of the invention is to provide a retaining device which will accommodate the ready removal of the drill from its supporting instrumentalities.

Another object of the invention is to provide a device of this type wherein the shock incidental the impact of the drill collar with the end of the retaining bushing will be reduced without impairing the efficiency in operation.

Another object of the invention is to provide a drill retainer which is adapted to prevent accidental ejection of the drill from the chuck.

These and other objects and the invention itself will become more apparent from the following description of an embodiment of this invention in which description reference will be had to the accompanying drawings forming a part of this specification.

Referring to the drawings:

Figure 1 is a fragmentary longitudinal sectional view of a fluid operated percussive mechanism embodying the invention;

Figure 2 is a sectional view taken in a plane indicated by line 2—2 in Figure 1;

Figure 3 is a detail perspective view of a washer employed in the present invention.

Referring to the figures of the drawings, wherein like parts are designated by similar reference characters, the embodiment of the fluid percussive drill which is illustrated herein comprises a head 10 formed with an axial bore 11 in which a bushing 12 is mounted, the bushing being adapted to receive therethrough the shank of a drill or similar tool 13. The end of the shank is subjected to impact by a hammer or piston 15, a fragmentary portion of which is illustrated in Figure 1.

The rearward longitudinal movement of the drill is limited by an annular integrally formed flange or collar 16 which is adapted to abut a shoulder 17 disposed in the bore adjacent the outer end of the bushing. In the forward portion of the bore 11 there is a pair of diametrically opposed longitudinal grooves 18 which receive ears or lugs 19 of a complemental configuration formed in the periphery of a washer 20.

Within the head 10 and slidably mounted upon the stem of the tool 13 there is a split sleeve 21 having a flanged end 23 which is adapted to abut a shoulder 24 formed in the bore 11. The washer 20 and a helical spring 25 are mounted upon the sleeve 21, the spring being disposed intermediate the flange 23 and the washer. A retaining cap 26, is screwthreaded in the free end of the head, the threaded shank portion 27 thereof being proportioned to engage the washer when the cap is adjusted in its operative position. The inner end of the cap 26 is formed with a pair of diametrically opposed radial grooves 28 which are adapted to receive a pair of radially disposed lugs 29 formed in the face of the washer 20.

In the organization of this mechanism the cap 26 is first slipped over the collar 16 and advanced outwardly upon the stem of the drill, the washer 20 and spring 25 are next sequentially disposed, then the split sleeve is positioned upon the drill stem and finally the cap washer and spring elements are located in their respective positions as illustrated in Figure 1. The drill including the sleeve subassembly may then be inserted within the bored head, the washer lugs 19 being aligned and engaged within the grooves 18 in the bore 11. The retaining cap 26 after being telescopically mounted upon the sleeve may now be adjusted within the head until a suitable spring pressure is effected against the washer 19. Accidental rotation of the cap and the consequential dislocation of the drill are thus avoided as the compressive effort of the spring will maintain the interengagement of the lug 29 and the groove 28 while the washer will be restrained from rotary movement by the interlocked ears 19 and grooves 18.

The drill may be dismantled by unscrewing the cap and withdrawing the tool and sleeve assembly, the removal of the cap being readily effected by forcibly overcoming the spring pressure upon the washer and dislodging the arcuate lugs 29 from their seats.

Although the foregoing description is necessarily of a detailed character in order that the invention may be clearly set forth it is to be understood that the specific terminology is not intended to be restrictive or confining and that various rearrangement of parts and modifications of structural detail may be resorted to without departing from the scope or spirit of the invention as herein claimed.

I claim:

1. The combination with the head of a percussion tool, of a collared drill operable therein, a cap removably engaged in the head, a sleeve in the head and cap, a spring encircling the sleeve, a washer interposed between the spring and cap, means for preventing rotation of the washer, and cooperating means for interlocking the washer and cap.

2. The combination with the head of a percussion tool, of a collared drill operable therein, a cap fitted in the head, a sleeve slidable in the head and cap, a washer detachably interlocked with the head and cap, and means for normally holding the washer yieldably interlocked with the cap.

3. The combination with the head of a percussion tool, of a collared drill operable therein, a cap threaded in the head, a sleeve slidable in the cap and head and having a flange upon its inner end, a washer, means for interlocking the washer with the head, a coil spring encircling the sleeve and interposed between the flange and washer for holding the washer yieldably interlocked with the cap.

4. The combination with the head of a percussion tool, of a collared drill operable therein, said head having longitudinal grooves therein, a washer having lugs engageable in the grooves, a cap threaded in the head, a sleeve slidable in the cap, means for interlocking the washer and cap, and yieldable means for holding the interlocking means active.

5. The combination with the head of a percussion tool, having longitudinal grooves therein, of a collared drill operable in the head, a washer having peripheral ears engaged in the grooves to prevent rotation of the washer, said washer having lugs thereon, a cap engaged in the head and having seats carried thereby, a sleeve slidable in the cap and having a flange upon its inner end, a coil spring encircling the sleeve and interposed between the flange and washer, said spring serving to normally maintain the lugs yieldably engaged in said seats.

In testimony whereof I hereunto affix my signature this 4th day of June, 1929.

ALFRED G. SLATCHER.